US010393313B2

United States Patent
Beier et al.

(10) Patent No.: US 10,393,313 B2
(45) Date of Patent: Aug. 27, 2019

(54) OIL CIRCUIT OF AN AIRCRAFT ENGINE

(71) Applicant: Rolls-Royce Deutschland Ltd & Co KG, Blankenfelde-Mahlow (DE)

(72) Inventors: Juergen Beier, Schulzendorf (DE); Markus Blumrich, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 1157 days.

(21) Appl. No.: 14/960,623

(22) Filed: Dec. 7, 2015

(65) Prior Publication Data
US 2019/0226358 A1  Jul. 25, 2019

(30) Foreign Application Priority Data
Dec. 18, 2014 (DE) .................. 10 2014 119 074

(51) Int. Cl.
  *F16N 7/40* (2006.01)
  *F01D 25/18* (2006.01)
  *F01D 25/20* (2006.01)

(52) U.S. Cl.
  CPC .............. *F16N 7/40* (2013.01); *F01D 25/18* (2013.01); *F01D 25/20* (2013.01)

(58) Field of Classification Search
  CPC . F01D 25/20; F01D 25/18; F02C 7/06; F16N 7/40; Y02T 50/671
  USPC ............................................... 184/6.11, 6.12
  See application file for complete search history.

(56) References Cited

U.S. PATENT DOCUMENTS

| 3,528,241 A | * | 9/1970 | Gill, Jr. | ..................... F02C 7/06 |
| | | | | 60/39.08 |
| 3,626,693 A | * | 12/1971 | Guillot | .................... F01D 25/18 |
| | | | | 123/196 S |
| 4,012,012 A | * | 3/1977 | Ligler | .................... B64D 33/00 |
| | | | | 123/196 S |

(Continued)

FOREIGN PATENT DOCUMENTS

DE     102004056295 A1   6/2006
GB        2130308 A       5/1984

OTHER PUBLICATIONS

German Search Report dated Sep. 14, 2015 for related German Application No. DE 10 2014 199 074.2.

(Continued)

*Primary Examiner* — Henry Y Liu
(74) *Attorney, Agent, or Firm* — Shuttleworth & Ingersoll, PLC; Timothy J. Klima

(57) ABSTRACT

An oil circuit of an aircraft engine, includes a tank, a lubricant pump and a recirculation pump. The lubricant pump supplies oil via a supply line from the tank to a load of the engine and to an accessory gearbox. Oil is resupplied via a recirculation conduit to the tank by the recirculation pump. The recirculation conduit is connected to the accessory gearbox via a further recirculation conduit. A valve is provided that can be switched between an open switching state and a closed state. In the open switching state of the valve, oil is supplied to the tank via the recirculation conduit. In the closed state of the valve device, an oil feed to the tank via the recirculation conduit is blocked, and oil from the recirculation conduit is supplied to the accessory gearbox via the further recirculation conduit.

11 Claims, 2 Drawing Sheets

(56) References Cited

U.S. PATENT DOCUMENTS

Figure 1:
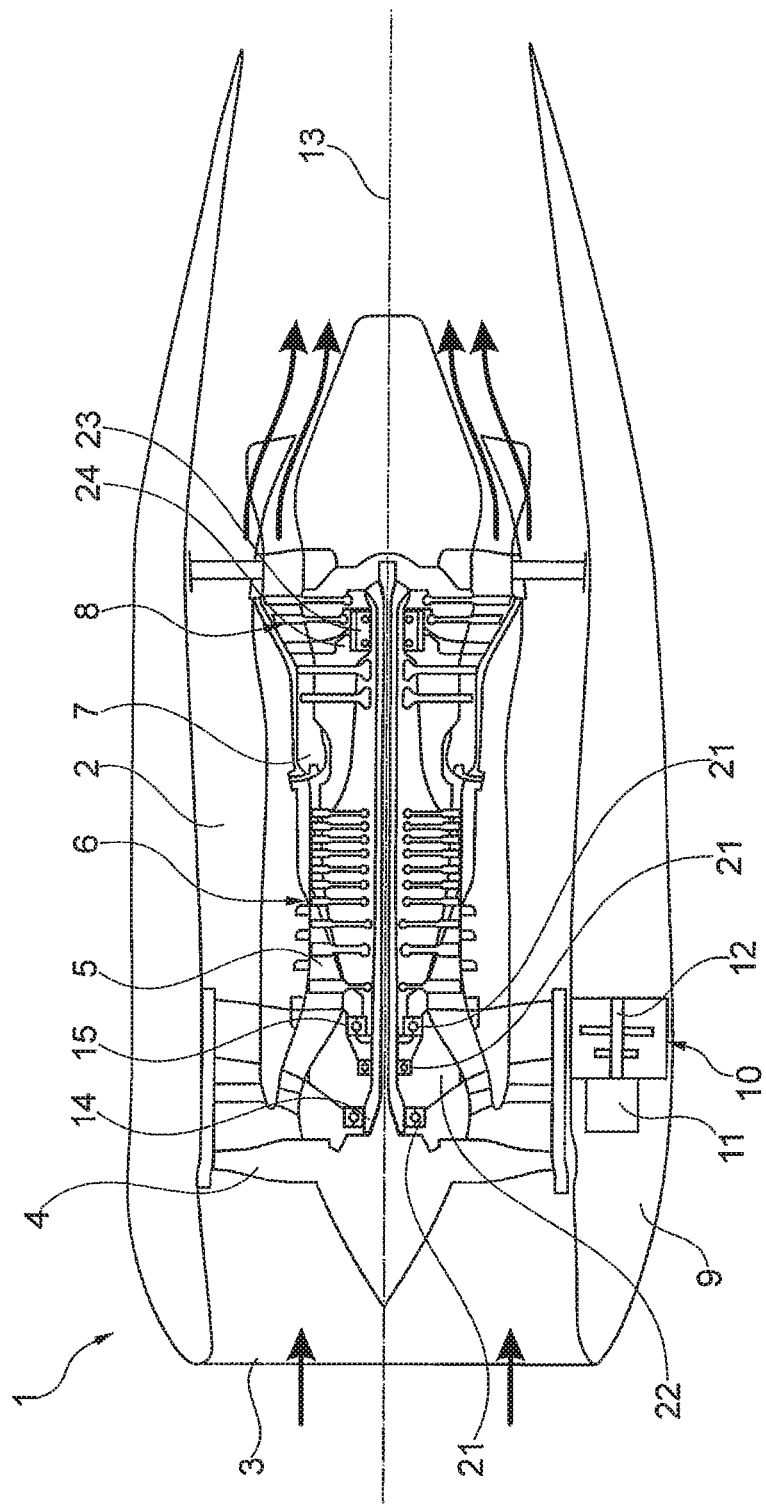

| | | | | |
|---|---|---|---|---|
| 4,573,373 A * | 3/1986 | Shimizu | ............... | F16H 3/54 |
| | | | | 184/6.12 |
| 4,629,033 A * | 12/1986 | Moore | ............... | F01M 5/00 |
| | | | | 184/27.2 |
| 4,715,244 A * | 12/1987 | Byrd | ............... | F16H 57/0402 |
| | | | | 184/6.12 |
| 4,891,934 A * | 1/1990 | Huelster | ............... | F01D 25/20 |
| | | | | 184/6.11 |
| 4,899,850 A * | 2/1990 | Koller | ............... | F01D 25/20 |
| | | | | 184/27.2 |
| 6,446,755 B1 * | 9/2002 | Varailhon | ............... | B64C 27/14 |
| | | | | 184/11.2 |
| 8,601,785 B2 * | 12/2013 | Legare | ............... | F01D 25/20 |
| | | | | 184/6.11 |
| 8,602,166 B2 * | 12/2013 | Mullen | ............... | B64C 27/14 |
| | | | | 184/6.12 |
| 8,881,870 B2 * | 11/2014 | Cornet | ............... | F01D 25/20 |
| | | | | 184/6.11 |
| 2001/0047647 A1 * | 12/2001 | Cornet | ............... | F01D 15/08 |
| | | | | 60/772 |

OTHER PUBLICATIONS

European Search Report dated May 25, 2016 for counterpart European application No. 15197327.8.

* cited by examiner

OIL CIRCUIT OF AN AIRCRAFT ENGINE

This application claims priority to German Patent Application 102014119074.2 filed Dec. 18, 2014, the entirety of which is incorporated by reference herein.

The invention relates to an oil circuit of an aircraft engine, comprising a tank device, a lubricant pumping device and at least one recirculation pump device in accordance with the type defined in more detail in the present disclosure.

In known oil circuits of aircraft engines, during operation of the engine, oil that is provided for lubricating and cooling is supplied by means of a lubricating oil line from a tank via a pumping device to loads for the purpose of lubrication and cooling. Provided as loads here are in particular an accessory gearbox and bearing devices which are arranged inside bearing chambers. From the respective oil sump of the loads and from an oil separator, oil is conveyed back into the tank via recirculation pumps, so-called scavenge pumps, and a joint recirculation conduit.

In order to avoid that oil runs back from the lubricating line into the tank after the engine has been switched off, a valve is arranged downstream of the pumping device that closes the lubricating line in the event of an engine cutoff. In this manner, the oil that is located downstream of the valve in the lubricating line is drained via a conduit into a housing of the accessory gearbox. The oil that is present in the area of the bearing chambers during engine cutoff is drained into the tank via the recirculation conduit. During startup of the engine, oil is conveyed from the tank to the loads for the purpose of lubrication, wherein the oil that is stored in the area of the ancillary equipment gear device is first supplied to the tank. The total amount of oil that is necessary for this purpose is also referred to as the engine gulp.

The object underlying the present invention is to provide an oil circuit of an aircraft engine that is embodied in a cost-effective and weight-optimized manner.

This objective is solved with an oil circuit with features as disclosed herein.

The oil circuit of an aircraft engine in accordance with the invention is embodied with a tank device, a lubricant pumping device and at least one recirculation pump device, wherein by means of the lubricant pumping device oil can be supplied via at least one supply line from the tank device to at least one load of the aircraft engine as well as to an accessory gearbox, and can be resupplied via at least one recirculation conduit to the tank device by means of at least one recirculation pump device.

In accordance with the invention it is provided that the recirculation conduit is connected to the accessory gearbox via a further recirculation conduit, wherein a valve device is provided that can be switched between at least one open switching state and a closed state, wherein in the open switching state of the valve device oil can be supplied to the tank device via the recirculation conduit, and in the closed state of the valve device an oil feed to the tank device via the recirculation conduit is blocked, and oil from the recirculation conduit can be supplied to the ancillary equipment gear device via the further recirculation conduit.

The oil circuit in accordance with the invention has the advantage that the valve device can be switched in such a manner that in the event of an engine cutoff oil does not flow back into the tank device, but is instead supplied to the accessory gearbox and stored in its area. In this manner, the amount of oil that has to be stored by the tank device in the event of an engine outage is small as compared to a conventionally embodied oil circuit in which a part of the oil of the oil circuit is drained into the tank device following an engine cutoff, and the tank device can be advantageously embodied so as to be small, light and cost-effective. In the oil circuit according to the invention, almost the entire amount of oil that is provided for lubrication, a so-called engine gulp, is stored in the area of the accessory gearbox during an engine outage, so that the amount of oil that is stored during an engine outage in the area of the tank device is small. Thus, with the oil circuit in accordance with the invention, the amount of oil that is stored in the area of the accessory gearbox during an engine outage is increased during an engine outage as compared to conventional oil circuits. However, since there is enough space within the housing of the ancillary equipment gear device for the amount of oil that is to be stored, known accessory gearbox can be used without constructional adjustments in the oil circuit in accordance with the invention.

In an advantageous embodiment of an oil circuit according to the invention, it is provided that the valve device is embodied in particular as a spring-loaded check valve. Such a valve device is switched between the open state and the closed state in particular in the event that during an engine cutoff a pressure that is present in the area of the recirculation conduit due to the recirculation pumps drops below a limiting pressure, for example one that can be set through the spring force. Thus, there is no need to provide an elaborate control mechanism for switching the valve device between the open and the closed state.

In an alternative embodiment of the oil circuit, the valve device is embodied as a selectable switch valve. In this manner, the switching of the valve device between the open state which facilitates an oil flow through the valve device and the state which prevents the oil flow through the valve device can be effected by the control device to the desired extent and in a flexible manner.

If a further valve device is arranged in the supply line downstream of the lubricant pumping device, with the supply line being connected by means of an additional recirculation conduit to the further recirculation conduit or leading into the same downstream of that further valve device, wherein in the open switching state of the further valve device oil from the tank device can be supplied to the loads via the supply line, and in the closed state of the further valve device an oil feed from the tank device in the direction of the load is blocked, also the oil that is present in the area of the supply lines is supplied via the additional recirculation conduit and the further recirculation conduit in the event of an engine cutoff of the ancillary equipment gear device, so that the tank device advantageously does not have to be embodied for the intake of an amount of oil that is present in this area during operation of the aircraft engine. Here, the further valve device can be embodied in an analogous manner as the valve device, for example as a check valve or switch valve.

In an advantageous embodiment of the oil circuit in accordance with the invention, at least one first throttle (restrictor) device is allocated to the further recirculation conduit, preferably being arranged so as to start at the at least one recirculation pump device upstream of an outlet area where the additional recirculation conduit leads into the further recirculation conduit. If the throttle device is embodied accordingly, it is thus guaranteed that during operation of the aircraft or jet engine oil is not guided via the further recirculation conduit in the direction of the accessory gearbox in an undesired amount, but instead the oil is supplied to the tank device through the valve device via the recirculation conduit.

If a second throttle device is arranged so as to start at the at least one recirculation pump device downstream of an outlet area where the additional recirculation conduit leads into the further recirculation conduit, it can be ensured in a simple manner that during operation of the engine oil which is conveyed from the tank device into the supply line is supplied to the loads and is not discharged in the direction of the accessory gearbox via the additional recirculation conduit.

In order to avoid in a simple and safe manner that in the event of an engine cutoff oil is guided via the additional recirculation conduit through the first throttle device in the direction of the recirculation conduit, but is guided in the direction of the accessory gearbox via the second throttle device, the first throttle device can have a smaller throughflow diameter than the second throttle device.

Preferably multiple recirculation pump devices are provided, via which oil can be supplied to the recirculation conduit from various loads.

In an advantageous embodiment of the oil circuit according to the invention at least one load is arranged in a bearing chamber and/or embodied as an oil separator of the aircraft engine.

In an advantageous embodiment of the oil circuit in accordance with the invention, the lubricant pumping device and the at least one recirculation pump device are formed by a single pumping device, in particular by one that is embodied as a rotary vane pump.

Both the features stated in the patent claims and the features stated in the following exemplary embodiment of the oil circuit in accordance with the invention are each suitable singly or in any combination with one another, to develop the subject matter of the invention.

Further advantages and advantageous embodiment of the oil circuit in accordance with the invention became apparent from the patent claims and the exemplary embodiments described in principle in the following with reference to the accompanying drawing, where the same reference numerals are used for components of identical design and function for greater clarity.

Figure 2:
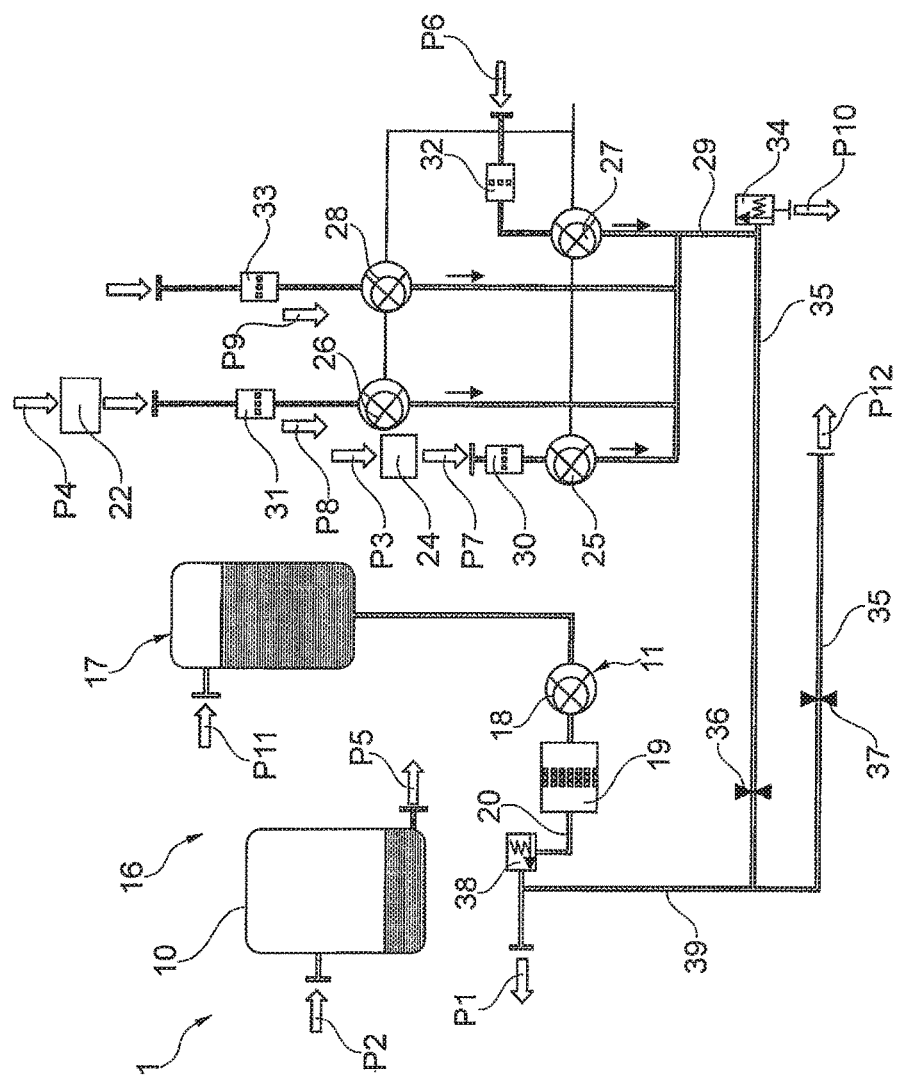

Here,

FIG. 1 shows a strongly schematized longitudinal section view of an aircraft engine with an ancillary equipment gear device having a pumping device; and FIG. 2 shows a simplified rendering of the oil circuit of the aircraft engine of FIG. 1.

FIG. 1 shows an aircraft engine or jet engine 1 of an aircraft in a longitudinal section view. The aircraft engine 1 is embodied with a bypass channel 2 and an inflow area 3, wherein a fan 4 connects to the inflow area 3 downstream in a per se known manner. In turn, downstream of the fan 4 the fluid flow in the aircraft engine 1 is split into a bypass flow and a core flow, wherein the bypass flow flows through the bypass channel 2 and the core flow flows into an engine core 5, which in turn is embodied in a per se known manner with a compressor device 6, a burner 7 and a turbine device 8.

In the shown embodiment, accessory gearbox 10 with auxiliary units, of which a pumping device 11 can be seen in FIG. 1, is arranged in the area of a housing 9 that surrounds the fan 4 in the radial direction. The auxiliary units 11 are respectively driven by auxiliary unit gear shaft 12, wherein the auxiliary unit gear shafts 12 are in operative connection with engine shafts 14, 15 that are mounted so as to be rotatable around a central axis 13 of the aircraft engine 1.

FIG. 2 shows an oil circuit 16 of the aircraft engine 1 that has a tank device 17 from which oil can be conveyed along a supply line 20 via a lubricant pump 18 and a filter device 19. Hereby, oil is supplied to loads, in the present case to the accessory gearbox 10 and bearing devices 21, 23, according to the arrows P1 to P4, wherein the bearing devices 21 are arranged inside a front bearing chamber 22, and the bearing device 23 is arranged inside a back bearing chamber 23. From an oil sump of the respective load 10, 21, 23 or of the bearing chambers 22, 24, oil is respectively supplied by a recirculation pump device 25 and 26, so-called scavenge pumps, to a joint recirculation conduit 29 according to the arrows P7 to P8. According to the arrows P5 and P6, [oil] is also supplied to the joint recirculation conduit 29 from an oil sump of the accessory gearbox 10 via a recirculation pump device 27.

A further recirculation pump device 28 is provided, via which oil that is separated—for example from an air-oil volume stream present in the area of the bearing chambers 22, 24—in the area of an oil separator that is preferably allocated to the accessory gearbox 10 can be supplied to the joint recirculation conduit 29. In the present case, a filter device 30, 31, 32 and 33 is respectively arranged upstream of the respective recirculation pump devices 25 to 28. Starting at the joint recirculation conduit 29, oil is resupplied to the tank device 17 through the recirculation pump devices 25 to 28 according to the arrows P10 and P11.

In the present case, the lubricant pump 18 and the recirculation pump device 28 are embodied as a joint pumping device 10, wherein in the present example the pumping device 10 is embodied as a rotary vane pump.

A valve device, which is embodied as a check valve 34 in the present case, is arranged in the area of the joint recirculation conduit 29. During operation of the aircraft engine 1 an operating pressure is present in the joint recirculation conduit 29 that holds the check valve 34 in an open state against the spring force of a spring of the check valve 34. In this manner, oil can be guided to the tank device 17 through the check valve 34 via the joint recirculation conduit 29 according to the arrows P10 and P11. If, for example during a switch-off of the engine 1, the pressure in the joint recirculation conduit 29 drops below a certain limiting pressure which is predetermined by the spring, the check valve 34 is closed and oil cannot any longer be supplied to the tank device 17 according to the arrows P10 and P11.

Upstream of the check valve 34, a further recirculation conduit 35 branches off from the joint recirculation conduit 29, by means of which oil can be introduced in this location via a first throttle device 36 and a second throttle device 37 through the bearing devices and a recirculation stage of the ancillary equipment gear device 10 into a housing of the accessory gearbox 10 according to the arrow P12. In the closed state of the check valves 34, oil that is drained from the bearing chambers 22, 24 is thus supplied to the accessory gearbox 10 via the joint recirculation conduit 29 and the further recirculation conduit 35, and is stored in the area of the accessory gearbox 10 in the event of an engine outage.

A further valve device that is also embodied as a check valve 38 is arranged downstream of the filter device 19 of the supply line 20, with an additional recirculation conduit 39 branching off from the supply line 20 downstream of that valve device. The additional recirculation conduit 39 leads into the further recirculation conduit 35 between the first throttle device 36 and the second throttle device 37. During operation of the aircraft engine 1, the check valve 38 is held in an open state through a pressure created by the lubricant pump 18 in the supply line against a force of a spring of the check valve 38, so that oil is conveyed from the tank device 17 in the direction of the loads 10, 21, 23. Here, the throttle devices 36, 37 have such a through-flow diameter that the oil conveyed by the lubricant pump 18 during operation of the aircraft engine 1 does not flow through the throttle devices 36, 37 but is supplied to the loads 10, 21, 23 via the supply line 20.

If, for example in the event of a switch-off of the aircraft engine 1, the pressure in the supply line 20 drops below a limiting pressure that is defined by the spring of the check valve 38, oil that is present in the supply line 20 downstream of the check valve 38 cannot be conveyed through the check valve 38 via the supply line 20 in the direction of the tank device 17, but is guided through the additional recirculation conduit 39 in the direction of the further recirculation conduit 35. Due to the fact that a flow diameter of the first throttle device 36 is smaller than a flow diameter of the second throttle device 37, the oil that is present in the area of the supply line 20 downstream of the check valve 38 is drained through the second throttle device 37 in the direction of the arrow 12 towards the accessory gearbox 10.

The valve devices 34, 38 are also referred to as so-called static anti leak valves.

During startup of the aircraft engine 1, the oil that is stored in the area of the accessory gearbox 10 is supplied to the tank device 17 according to the arrows P5, P6 and P10 via the joint recirculation conduit 29, and from the tank device 17 the loads 10, 21, 23 and all other desired elements of the aircraft engine 1 are in turn supplied with oil.

In contrast to known oil circuits, in which oil is at least partially drained from the oil circuit into a tank device during a switch-off of the engine, the tank device 17 can be embodied so as to be smaller, lighter and more cost-effective, since a larger portion of the drained oil is stored in the area of the accessory gearbox 10, and no storing space has to be provided for this purpose in the area of the tank device 17.

PARTS LIST 1 aircraft engine
2 bypass channel
3 inflow area
4 fan
5 engine core
6 compressor device
7 burner
8 turbine device
9 housing
10 accessory gearbox
11 pumping device
12 auxiliary unit gear shaft
13 central axis
14 engine shaft
15 engine shaft
16 oil circuit
17 tank device
18 lubricant pump
19 filter device
20 supply line
21 bearing device
22 front bearing chamber
23 bearing device
24 back bearing chamber
25 to 28 recirculation pump device
29 joint recirculation conduit
30 to 33 filter device
34 valve device; check valve
35 further recirculation conduit
36 first throttle device
37 second throttle device
38 further valve device; check valve
39 additional recirculation conduit
P1 to P12 arrow

The invention claimed is:

1. An oil circuit of an aircraft engine, comprising: a tank device, a lubricant pumping device and at least one recirculation pump device,
  at least one supply line via which oil is supplied from the tank device to at least one load of the aircraft engine and to an accessory gearbox by the lubricant pumping device,
  at least one recirculation conduit by which the oil is resupplied to the tank device by the at least one recirculation pump device,
  a further recirculation conduit connecting the at least one recirculation conduit to the accessory gearbox,
  a valve device that is switchable between at least one open switching state and a closed state, wherein in the open switching state of the valve device oil is supplied to the tank device via the at least one recirculation conduit, and in the closed state of the valve device an oil feed to the tank device via the at least one recirculation conduit is blocked, and oil from the at least one recirculation conduit is supplied to the accessory gearbox via the further recirculation conduit.

2. The oil circuit according to claim 1, wherein the valve device is a check valve.

3. The oil circuit according to claim 1, wherein the valve device is a switch valve.

4. The oil circuit according to claim 1, and further comprising: a further valve device arranged in the at least one supply line downstream of the lubricant pumping device,
  an additional recirculation conduit connecting the at least one supply line to the further recirculation conduit downstream of the further valve device, wherein in the open switching state of the further valve device oil is supplied to the at least one load via the supply line, and in the closed state of the further valve device an oil feed from the tank device in a direction of the at least one load is blocked.

5. The oil circuit according to claim 4, and further comprising at least one first restrictor device in the further recirculation conduit.

6. The oil circuit according to claim 5, and further comprising a second restrictor device arranged starting at the at least one recirculation pump device downstream of an outlet area of the additional recirculation conduit into the further recirculation conduit.

7. The oil circuit according to claim 6, wherein the first restrictor device has a smaller through-flow diameter than the second restrictor device.

8. The oil circuit according to claim 1, wherein the at least one load includes a plurality of loads and the at least one recirculation pump device includes a plurality of recirculation pump devices via which oil is supplied to the at least one recirculation conduit from the plurality of loads.

9. The oil circuit according to claim 1, wherein the at least one load is arranged inside a bearing chamber of the aircraft engine.

10. The oil circuit according to claim 1, wherein the at least one load of the aircraft engine is an oil separator.

11. The oil circuit according to claim 1, wherein the lubricant pumping device and the at least one recirculation pump device are formed by a single pumping device that is a rotary vane pump.

* * * * *